United States Patent [19]

Ledbetter

[11] 4,244,217
[45] Jan. 13, 1981

[54] GAS FLOW MONITOR

[76] Inventor: R. K. Ledbetter, 6435 SW. 85 St., Miami, Fla. 33143

[21] Appl. No.: 970,562

[22] Filed: Dec. 18, 1978

[51] Int. Cl.³ .............................................. G01F 1/68
[52] U.S. Cl. .......................................................... 73/204
[58] Field of Search ............................................ 73/204

[56] References Cited

U.S. PATENT DOCUMENTS

| | | | |
|---|---|---|---|
| 1,156,630 | 10/1915 | Savage | 73/204 |
| 1,260,498 | 3/1918 | Wilson | 73/204 |
| 1,291,489 | 1/1919 | Hadaway, Jr. | 73/204 |
| 1,691,600 | 11/1928 | Brush, Jr. et al. | 73/204 |
| 1,902,427 | 3/1933 | Sawyer | 73/204 |
| 2,612,047 | 9/1952 | Nilsson et al. | 73/204 |
| 3,085,431 | 4/1963 | Yerman et al. | 73/204 |
| 3,246,515 | 4/1966 | Martino et al. | 73/204 |

Primary Examiner—Herbert Goldstein

[57] ABSTRACT

A gas flow monitor which includes a sensor composed of a pair of identical parallel wires to be positioned in spanning relation of the flow path of a duct and a heater to heat the length of one of the closely adjacent identical wires and wherein a voltage measuring device is provided to measure the voltage drop and hence the resistance across each of the wires which are energized by a constant current source and are in series with one another so that, upon comparison of the two, the effect of increased air flow through the duct will affect both wire lengths equally and the effect of any increase in air flow through the duct will have a net effect only of offering the resistance of the heated length of wire by reason of heat exchange between the heated wire.

6 Claims, 4 Drawing Figures

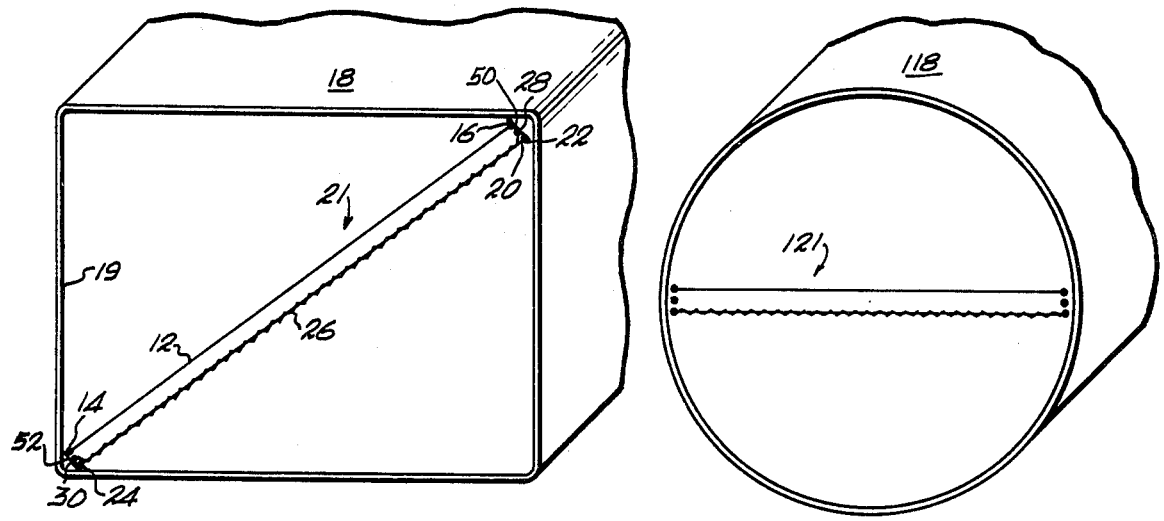
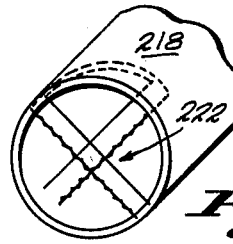
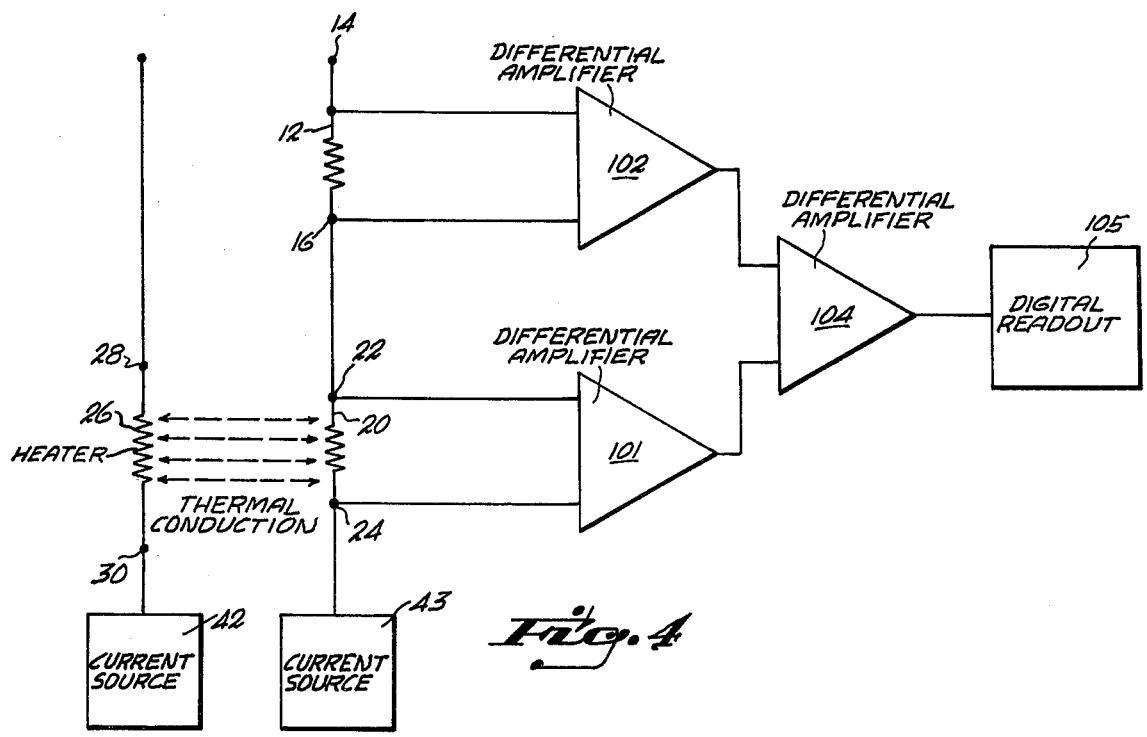

GAS FLOW MONITOR

FIELD OF THE INVENTION

This invention relates to an air flow monitor for use in determining air flow through a duct for air flow control and metering.

BACKGROUND OF THE INVENTION

In the past, the conventional method of measuring low velocity air movement, that is movement of less than 100 feet per minute, is to employ a hot wire anemometer. Such a conventional device provides a heated copper wire and means to sense the change due to the cooling effect of air moving across it. In using such a prior art device, the temperature of the heated wire is affected by ambient temperature as well as the air flow across it; and, the hot wire anemometer senses a very small area, a few millimeters across. Thus, in order to determine the air flow in a pipe, or a duct, or any area of significant size, it is necessary to take numerous measurements at various points and, thereafter, to average these readings. The present invention is of a different structure and is intended to overcome the limitations of the prior art hot wire anemometers described above in that it monitors the ambient temperature of the air and corrects for air temperature and samples a relatively large area giving an instantaneous readout of the average air flow.

OBJECTS OF THE INVENTION

It is, accordingly, an object of this invention to provide an improved air flow monitor which includes a sensor having a pair of closely adjacent identical wires, both of which are exposed but only one of which is heated so that when the sensor is arranged in spanning relation of an air flow duct, the difference of electrical resistance of the wires to an equal source in each will be a measure of air flow velocity over the sensor. The device includes means to measure the resistance difference between that of the heated wire and that of the the unheated wire. Thus, the effects of ambient temperature are cancelled out so that the net effect of the difference in resistance is that due to changes in velocity of gas flow through the duct.

It is a general object of this invention to provide an improved air flow monitor which provides a device to monitor the flow of gas through a duct, to measure its velocity through a known cross sectional area and which provides for sampling of a relatively large area and provides an instantaneous readout of the average air flow.

It is another object of this invention to provide an air flow monitor of the type described hereinafter which is simple and inexpensive to manufacture, and well adapted for the purposes which are set forth more fully herein.

In accordance with these and other objects which have become apparent hereinafter, the instant invention will now be described with reference to the accompanying drawings, in which:

DESCRIPTION OF THE DRAWINGS

FIG. 1 is a view illustrating the mouth of a duct or a cross sectional area across which the sensor of an air flow monitor according to the instant invention is installed;

FIG. 2 is a view similar to FIG. 1 and illustrating the sensor installed in a duct of circular cross section;

FIG. 3 is a view similar to FIG. 2 and illustrating a pair of sensors arranged in series with one another; and FIG. 4 is a schematic circuit diagram illustrating the instant invention.

DESCRIPTION OF THE PREFERRED EMBODIMENT

Referring to the drawings wherein like reference characters designate like or corresponding parts throughout the several views and referring particularly to FIG. 1, there is shown a duct 18 having a mouth or cross sectional zone indicated by the plane designated by the numeral 19. A sensor generally designated by the numeral 21 is provided in spanning relation diagonally of the duct. The sensor 21 is composed of three wires, a first wire 12, having its opposite ends 14 and 16 suitably connected to the duct, a second wire, parallel to the first wire and identical to it which is designated by the numeral 20, the opposite ends 22 and 24 of which are suitably mounted to the duct. The second wire 20 is wrapped with a tightly twisted wire 26 in heat-exchanging relation with the wire 20; and the opposite ends 28 and 30 of this twisted wire are connected to the duct. The support connection of the wires at the duct are insulated as is conventional in the art, such as by an insulation block of Bakelite, glass, or the like, of non-conductive material.

The wires are of electrically conductive material, for example, copper. The wire 26 which is tightly twisted about the wire 20 is a heater wire comprising a heater element with a very low temperature coefficient. It is heated with a constant current source 42 so that it has a known temperature rise above ambient temperature which drops with the cooling effects of air flowing across it. The wire 12 which is identical to the wire 20 is not heated. The resistance of this wire varies with ambient temperature. The wires, 12 and 20 are connected in series with one another and with a current source 43. Thus, the voltage drop across wire length 12 and the voltage drop across the wire length 20 are proportional to the resistance which is offered to the current flow by each length. By means of a first differential amplifier 101 which includes a voltage measuring means, the voltage drop of the heated wire length 20 and, hence, its resistance, is determined. By means of a second differential amplifier means 102 which includes a voltage measuring means, the resistance of wire length 12 is determined.

The differential amplifiers 101 and 102 are in parallel with a differential amplifier 104 including a measuring means which measures the difference in resistance in the two wire lengths. Because the air flow affects the temperature and hence the resistance of wire lengths 12 and 20 and an output is produced from differential amplifier 104. However, it is pointed out that a change in ambient temperature affects the resistance of the identical wires 12 and 20 equally. As a result, these two changes are cancelled out by the differential amplifier means 104. Thus, the air flow monitor responds to changes in air flow velocity and ignores any ambient temperature change.

With respect to the embodiments of FIGS. 2 and 3, the ducts 118 and 218 respectively are spanned in the case of FIG. 2 by sensor 121 and in FIG. 3 by a dual sensor 221, which criss-cross one another but whose elements are arranged in series with one another. It will be understood that the differential technique described above, permits the sensors to be configured so as to span virtually any shape so that the area may be instantaneously and continuously monitored. Utilizing this invention, the average or total air flow over any area is monitored and read out directly rather than measuring individual points and averaging these, thus providing an air flow monitor which is instantaneous and continuous and is not susceptible to local areas of erratic turbulence which would detract from its accuracy rendering the air flow monitor of the instant invention responsive to total air flows and air flow control and metering.

It will be seen that suitable means are provided for installing the sensor comprising the heated wire and the parallel adjacent identical unheated wire in spanning relation of a duct which may be in the form of a disc 50 and 52 represented by the lines so designated in FIG. 1, or terminal block, which is sized so that the sensor will span the distance between the corners of the duct which are in diagonal relation with respect to one another. The sensor may be fixed in the duct by any suitable means, or on a frame or support to be inserted into a duct. Numerous suitable alternative means may be provided, including the provision of a hole in one of the corners so that the sensor may be inserted therethrough. Alternatively, the same could be welded, or otherwise temporarily fastened in spanning relation of the duct. Finally, it will be seen that a digital readout in the form of a conventional market available device 105 is preferably provided for a continuous ability to read the difference in the resistances of the heated and unheated wire in suitable form, well within the range of those skilled in the art.

What is claimed is:

1. An air flow monitoring device comprising,
   a sensor for use in measuring gas flow velocity, the sensor comprising:
   a first metal electrically conductive wire having a first and a second end of a predetermined length;
   a second metal electrically conductive heated wire identical to said first wire and parallel to and closely adjacent said first wire;
   means to heat the second wire substantially uniformly along the length thereof; and means to hold said first and second wire in closely adjacent parallel relation; and
   a heater means for heating the second wire substantially uniformly along the length of the second wire comprising a third wire coiled about the length of the second wire including a heater circuit having a power source;
   the first and second wires in series having a means to measure the resistance of each wire and the resultant difference therebetween and
   means to hold said first and second wire in closely adjacent parallel relation.

2. The device as set forth in claim 1 wherein the sensor includes means to attach the first and second ends of said first and second wires in spanning relation of a duct, and including means to maintain said first and second wire in closely adjacent parallel relation with respect to one another.

3. The device as set forth in claim 1 or 2 wherein said circuit means includes a differential amplifier means to sense the difference in resistance to the current flow through the first and second wire.

4. The device as set forth in claim 3 wherein said circuit means includes a digital readout device connected to said differential amplifier to display the difference in resistance between the first and second wire and responsive in changes of velocity flow through the duct.

5. The device as set forth in claim 1 wherein the device is adapted to measure low velocity air movements (less than 100 feet per minute) in a duct having significant cross sectional area.

6. The device as set forth in claim 2 or 5 wherein the device is in combination with a duct and the center is of a predetermined size companionate with respect to the distance across the central zone of the cross sectional area of the duct.

* * * * *